United States Patent

Ono et al.

[11] Patent Number: 5,895,895
[45] Date of Patent: Apr. 20, 1999

[54] INPUT PEN

[75] Inventors: Kazuhiko Ono, Hadano; Shinya Kamei, Hiratsuka, both of Japan

[73] Assignees: Pilot Precision Kabushiki Kaisha; Graphtec Kabushiki Kaisha, both of Kanagawa-ken; Kabushiki Kaisha Pilot, Tokyo, all of Japan

[21] Appl. No.: 08/769,735

[22] Filed: Dec. 19, 1996

[30] Foreign Application Priority Data

| Dec. 27, 1995 | [JP] | Japan | 7-353437 |
| Jan. 11, 1996 | [JP] | Japan | 8-020355 |
| Feb. 20, 1996 | [JP] | Japan | 8-056830 |
| Mar. 26, 1996 | [JP] | Japan | 8-096083 |
| Apr. 18, 1996 | [JP] | Japan | 8-121100 |

[51] Int. Cl.$^6$ .................................................. G08C 21/00
[52] U.S. Cl. ............................ 178/19.03; 178/19.01; 178/19.04; 178/19.05
[58] Field of Search .......................... 178/18.01, 18.03, 178/18.05, 18.07, 19.01, 19.03, 19.04, 19.05; 345/173, 179, 180, 182, 183

[56] References Cited

U.S. PATENT DOCUMENTS

| 4,667,182 | 5/1987 | Murphy | 345/179 |
| 4,868,351 | 9/1989 | Watanabe et al. | 178/19.03 |
| 5,528,008 | 6/1996 | Danek | 345/179 |
| 5,576,502 | 11/1996 | Fukushima et al. | 178/18.07 |

*Primary Examiner*—Vijay Shankar
*Attorney, Agent, or Firm*—Ladas & Parry

[57] ABSTRACT

In an input pen for transmitting to a tablet 19 information of variation in writing pressure as well as information of designated positions, a joint 10 is mounted on the rear end of a shaft a writing tip 12. A movable magnetic core 9 is attached to the joint 10. A push rod 13 is passed in the pen body in such a manner that longitudinal position of the push rod is controllable, with a resilient member 11 interposed between the push rod 13 and the joint 10. Longitudinal position of the push rod 13 is adjusted in order to control the load upon mounting of the resilient member 11. It is thus possible to control the load upon mounting of the resilient member 11 biasing the writing tip 12 forward by adjusting the position of the push rod 13, whereby the resilient member 11 can be mounted constantly under a predetermined load independently of variation in dimensions of components. A reliable detection of writing pressure applied to the writing tip 12 by operator's hand is therefore made possible.

21 Claims, 12 Drawing Sheets

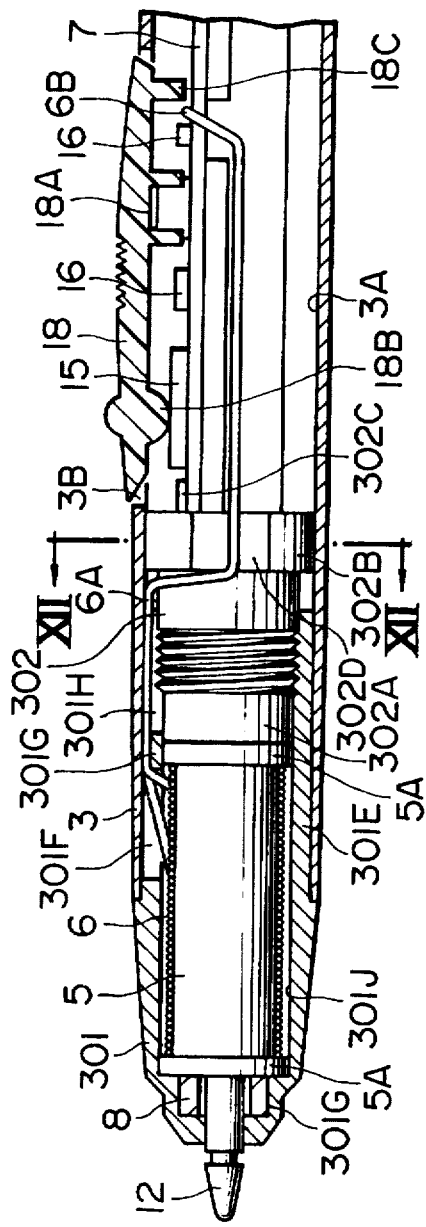
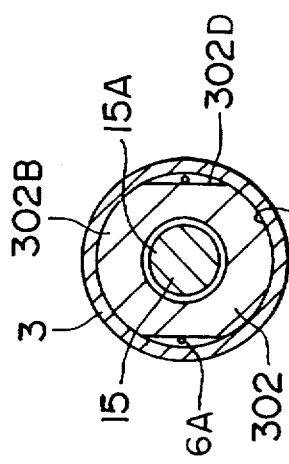
FIG. 11
FIG. 12

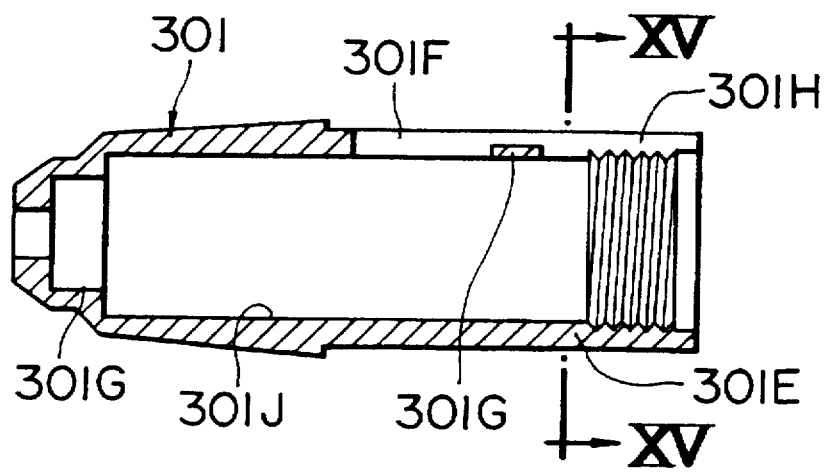
F I G. 14
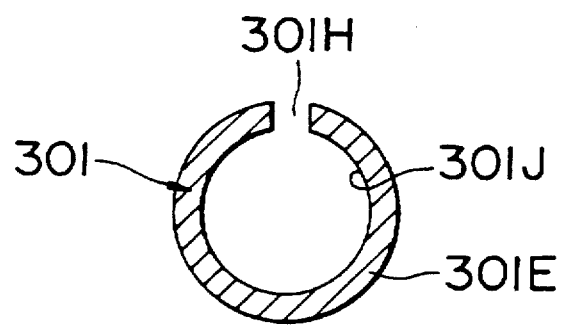
F I G. 15

INPUT PEN

BACKGROUND OF THE INVENTION

1. Field of the Invention

The present invention relates to an input pen for transmitting information of designated positions as well as information of variations in writing pressure applied to a writing tip to a tablet in the field of, e.g., computer graphics.

2. Description of the Related Arts

In order to draw lines depending on the writing pressure applied to the writing tip of an input pen, in other words, to draw a thick line when a strong writing force is applied to the input pen, and a thin line when a weak writing force is applied to the input pen, pressure sensors have hitherto been arranged over the entire coordinate input area of the tablet, or alternatively a force sensor has been provided within the input pen to detect the writing pressure applied to the input pen.

However, distributing the pressure sensors over the entire coordinate input zone resulted in a complicated structure and in a difficulty in achieving exact detection of the writing pressure over the entire zone. On the contrary, disposing the pressure sensor within the input pen inevitably necessitated a cable for supplying information of writing pressure and resulted in a poor maneuverability during the input operation.

In the case of an input pen of this type, a coil for use in transmitting the information of designated positions to the tablet is composed of a wire wound directly around a magnetic core or a wire wound around a cylindrical bobbin. Inconveniently, the input pen employing such a coil often gave birth to an inadvertent contact of the wire when the coil is inserted in the bore of the pen body, and had a poor workability in inserting the coil and a possibility of breaking or severing of the wire.

The conventional input pen further involved drawbacks in that the diameter of a writing tip member and an outer barrel is enlarged and that the tip member and an inner barrel must be individually secured to the outer barrel because it is impossible to screw the inner barrel into the tip member due to intervention of the wire, thus resulting in a complicated structure as well as in complication in assembling work. Additionally, when the inner barrel is inserted into the outer barrel, the wire may possibly be damaged or even severd since the wire is forcibly clamped between a collar of the inner barrel and the bore of the outer barrel.

In the conventional input pen, a side button was fixedly mounted on the outer barrel so that a press section of the side button can be used for operating a switch on a substrate to transmit switching information to the tablet. In the case of fixedly mounting the side button on the outer barrel, however, there arose a problem of insecure switching operation due to displacement of the side button press section from its intended position confronting the switch, which is caused by a variance in relative mounting position of the outer barrel and the inner barrel.

In the conventional input pen, a base was mounted on the pen body by means of bent metal fittings disposed on the base. Thus, the mounting position of the base relative the pen body was uncertain. This resulted in an offset of the relative position between the switch disposed on the base and the side button located on the pen body, giving rise to uncertain switching operation. In addition, the bending of the metallic components was troublesome and laborious, and hence caused an increase in production costs.

SUMMARY OF THE INVENTION

It is therefore a main object of the present invention to provide an input pen simple in structure, ensuring a correct detection of writing pressure as well as eliminating any need for a wire or cable for supplying information on the writing pressure.

It is another object of the present invention to provide an input pen free from breakage or severing of the coil wire.

It is a further object of the present invention to provide an input pen enabling easy insertion of the wire during the assembly.

It is still another object of the present invention to provide an input pen ensuring a reliable switching operation by means of a side button.

It is a still further object of the present invention to provide an input pen capable of correct positioning of electric components on a base when they are mounted.

It is still yet another object of the present invention to provide an input pen capable of preventing its interior of the pen body from being viewed through a gap between the side button and the pen body.

The above main object of the present invention is accomplished by the provision of an input pen comprising a pen body; an electric coil including a bobbin and an electric wire wound therearound, said bobbin being secured within the pen body and having a longitudinal through-hole extending therein; a writing tip member having a shaft extending rearward and fitted slidably within the pen body, the writing tip member having a writing tip projecting beyond a forward end of the pen body; a movable magnetic core fitted in the through-hole of the coil and connected with the writing tip member with respect to a longitudinal direction of the pen body; a fixed magnetic core provided within the through-hole; the writing tip upon writing being pressed into the pen body to displace the movable magnetic core relative to the fixed magnetic core, thereby producing a variation in inductance of the coil, which variation providing information of a variation in writing pressure; a joint secured both to the shaft of the writing tip and to the movable magnetic core; a push rod received within the pen body at a rear of the joint for longitudinal displacement; resilient means interposed between the push rod and the joint; and means for adjusting and fixing a longitudinal position of the joint to control a resilient force of the resilient means.

The above and other objects, features and advantages attendant thereon of the present invention will become more apparent in light of the following description with reference to the accompanying drawings.

BRIEF DESCRIPTION OF THE DRAWINGS

FIG. 11 is a fragmentary longitudinal sectional view showing still another embodiment of the input pen in accordance with the present invention;

FIG. 12 is a sectional view taken along a line XII—XII of FIG. 11;

FIG. 14 is a sectional view of a foremost cylinder of the FIG. 11 embodiment;

FIG. 15 is a sectional view taken along a line XV—XV of FIG. 14;

DESCRIPTION OF THE PREFERRED EMBODIMENTS

Figure 1:
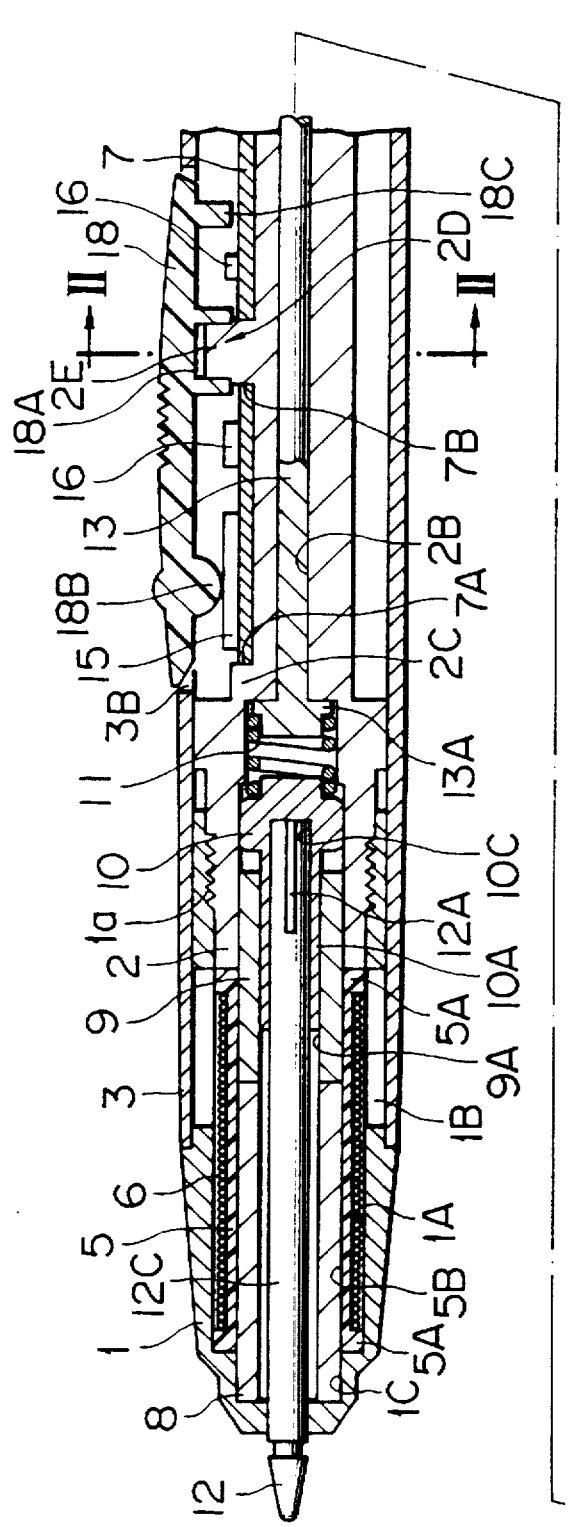
FIG. 1 is a longitudinal sectional view showing an embodiment of an input pen in accordance with the present invention.
Figure 1:
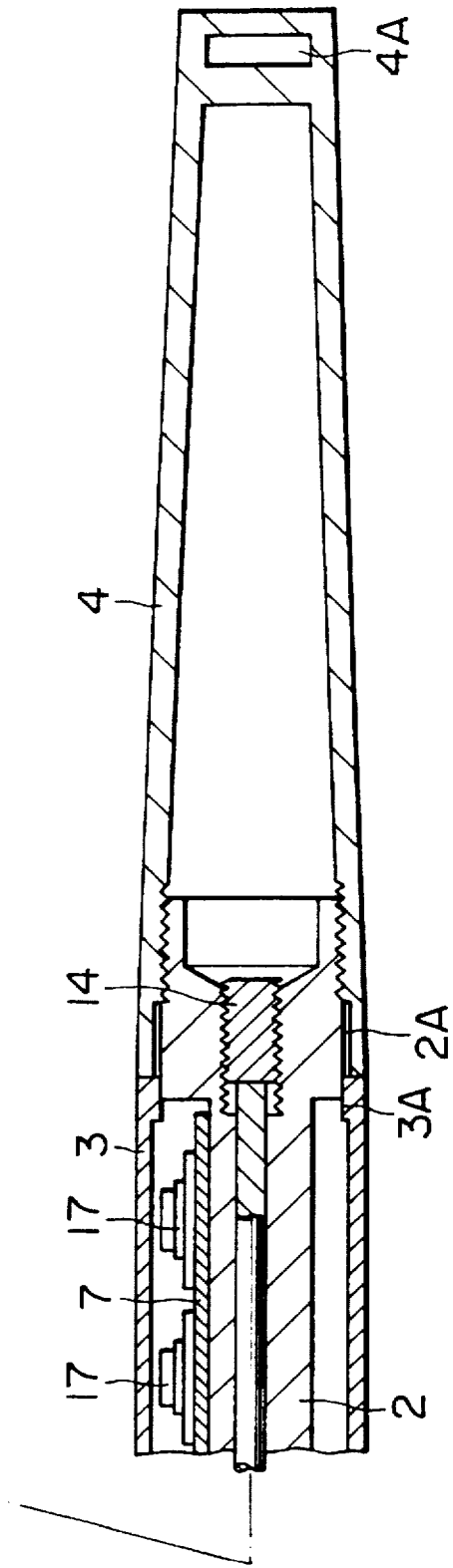
Figure 2:
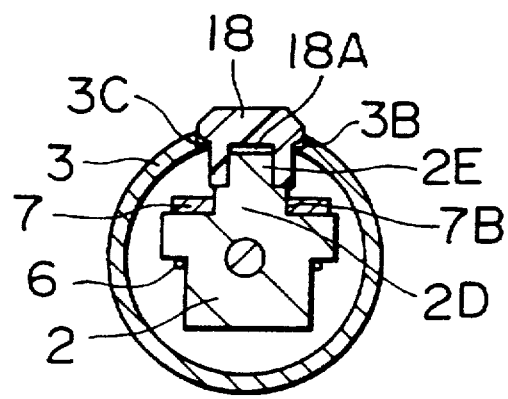
FIG. 2 is a sectional view showing a section taken along a line II—II of FIG. 1.

An input pen in accordance with the present invention will now be described with reference to FIGS. 1 to 8 which illustrate an embodiment thereof in a non-limitative manner. Reference is first made to FIG. 1 in which the left-hand side will be referred to hereinafter as the front or forward side and the right-hand side to the rear or backward side. A foremost cylinder 1 has at its rear part a female screw portion 1a in which is screwed a front part of an inner barrel 2, the inner barrel 2 being inserted in the interior of an outer barrel 3 through a front opening thereof. The inner barrel 2 has a rear part protruding beyond the rear end of the outer barrel 3 in such a manner that a key groove 2A formed partially in the rear part of the inner barrel 2 is engaged with a key 3A formed on the rear end of the outer barrel 3. A rear cap 4 is screwed onto the rear part of the inner barrel 2 so that the outer barrel 3 is clamped between the foremost cylinder 1 and the rear cap 4. The body of the input pen is comprised of the above-described foremost cylinder 1, inner barrel 2, outer barrel 3 and rear cap 4.

A wire 6 is wound a predetermined number of turns to provide a coil on a bobbin 5 made of a synthetic resin and having collars 5A formed at its opposite ends. The collars 5A at the opposite ends of the bobbin 5 are press fitted into a bore 1A of the foremost cylinder 1 and fixedly secured. Anchoring of the collars 5A of the bobbin 5 to the bore 1A of the foremost cylinder 1 is not limited to the press-fitting and may be made by adhesion or a combination of the press-fitting and adhesion. The coil wire 6 is led through a side aperture 1B of the foremost cylinder 1 and through a groove formed in the peripheral surface of the foremost cylinder 1 to a base 7 which will be described later.

The bobbin 5 includes a through-hole 5B of which the front part receives a fixed magnetic core 8 made of ferrite, the fixed core being anchored in a front bore 1C of the foremost cylinder 1 and in the through-hole 5B of the bobbin 5. A movable magnetic core 9 made of ferrite is axially slidably received in the rear part of the through-hole 5B of the bobbin 5. The movable core 9 is anchored to a cylinder joint 10. More specifically, the movable core 9 is fitted on a tubular front part 10A of reduced diameter of the joint 10. The fixed core 8 and the movable core 9 are usually brought in abutment against each other by the elastic force of a resilient member 11 which will be described later. The radially outwardly projecting height of the above-described collars 5A is so determined as to be larger than the diameter of the wire 6. Thus, the radially outermost surfaces of the turns of the wire 6 is positioned lower than the height of the collars 5A of the bobbin 5. Therefore, when the collars 5A are being press fitted into the bore 1A of the foremost cylinder 1, the wire 6 is prevented from coming into contact with the bore 1a of the foremost cylinder 1, whereby the press fitting operation is facilitated and any fear of breaking or severing the wire 6 is eliminated.

Figure 4:
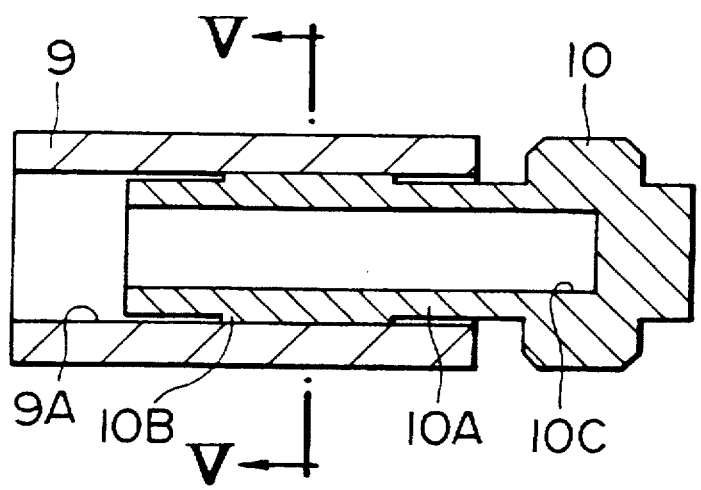
FIG. 4 is an enlarged sectional view showing a movable core and a joint fitted thereinto of the input pen in accordance with the present invention.
Figure 5:
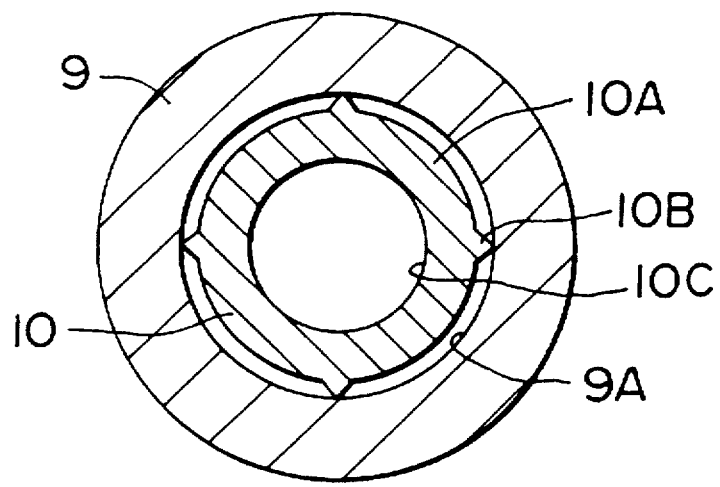
FIG. 5 is a further enlarged sectional view taken along a line V—V of FIG. 4.

Description will be given in detail of means for anchoring the movable core 9 to the joint 10. As shown in FIGS. 4 and 5, four longitudinally extending ridges 10B are provided to be equally spaced circumferentially on the outer peripheral surface of the front part 10A of the joint 10, the ridges 10B being press-fit anchored into a through-hole 9A of the movable core 9. The press-fitting of the reduced diameter front part 10A into the through-hole 9A of the movable core 9 will enable the outer diameter of the joint 10 to be reduced as compared with that of a joint of the type wherein the joint is fitted on the outer surface of the movable core 9, whereby an outer barrel 3 of reduced diameter is obtained.

Figure 6:
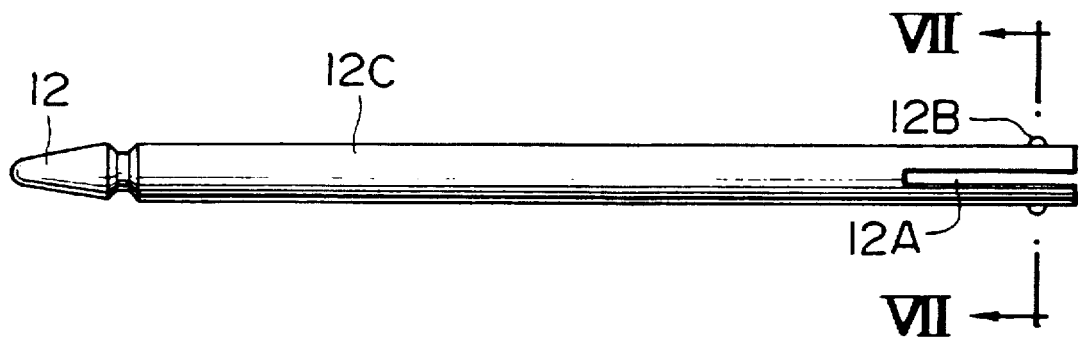
FIG. 6 is an enlarged front view showing a writing tip member of the input pen in accordance with the present invention.
Figure 7:
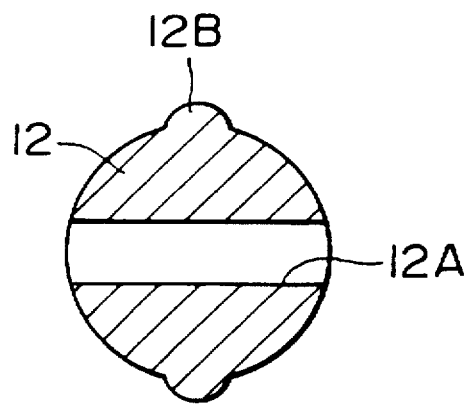
FIG. 7 is a further enlarged sectional view taken along a line VII—VII of FIG. 6.

As shown in FIG. 1, an inner bore 10C of the joint 10 receives removably the rear end part of a shaft 12C of a writing tip member 12. Description will be given of means for coupling the writing tip member 12 to the joint 10. As shown in FIGS. 6 and 7, a slit 12A extends longitudinally through the rear part of the shaft 12C of writing tip member 12 so as to divide the shaft 12C into halves each having a protrusion 12B on its outer surface. When the rear part of the shaft 12C is inserted into the bore 10C of the joint 10, the halves are deflected to come into press contact with the inner wall defining the bore 10C of the joint 10, whereby the shaft 12C is removably conected to the joint 10. Arrangement is such that the writing end of the tip 12 projects from the end of the foremost cylinder 1 by a predetermined length. In order to make exact control of the distance of projection of the tip 12, the press fitting of the joint 10 into the movable core 9 is made while checking the amount of projection of the tip 12. In other words, the press fitting operation of the joint 10 into the core 9 is stopped when a predetermined fitting amount is obtained. Thus, regardless of any variation in dimensions of the fixed core 8 and the movable core 9, the amount of projection of the writing tip 12 is constantly controlled as desired.

The inner barrel 2 includes a bore 2B which receives the rear part of a push rod 13 from forward. The resilient member 11 in the form of a coil spring is interposed between a collar 13A at the front end of the push rod 13 and a rear shoulder of the joint 10. A screw 14 is screwed into the rear end of the inner barrel 2 so that the screwing motion of the screw 14 urges the push rod 13 forward to compress the resilient member 11. The load to be applied to the resilient member 11 at the time of mounting is adjusted by fastening or loosening the screw 14. It would ideally be most desirable to set the preset load upon mounting of the resilient member 11 to zero gram since any pressure applied to the writing tip 12 including zero gram can be detected, but practically it may be set to e.g., 50 grams in view of the ease of the assembly work.

Figure 8:
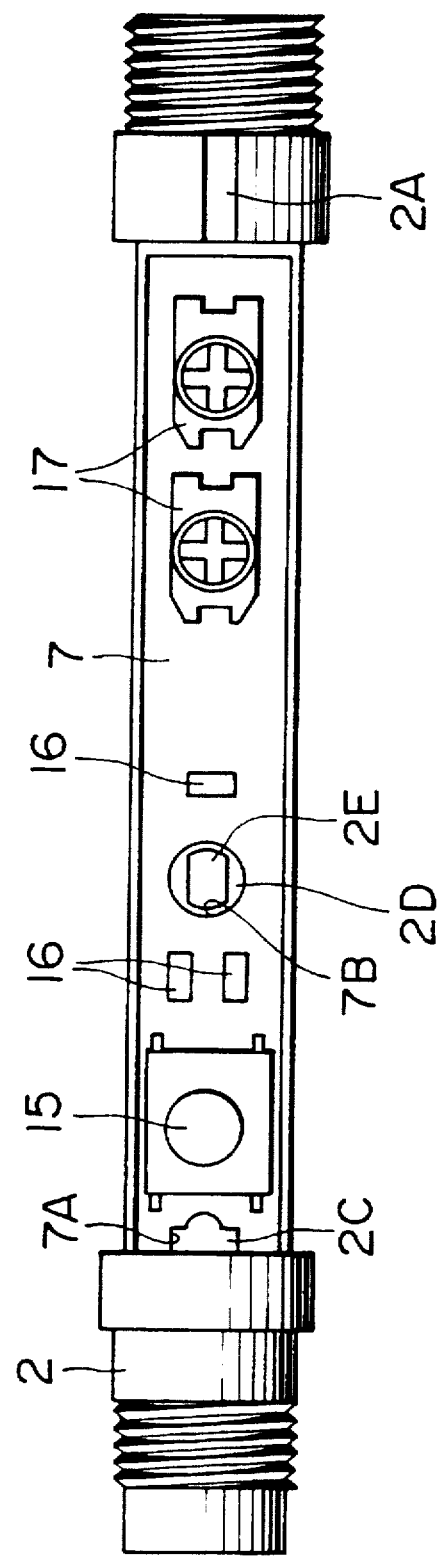
FIG. 8 is a top plan view showing a substrate mounted on an inner barrel of the input pen in accordance with the present invention.

Referring to FIG. 8, the base 7 is in the form of a plate and has mounted thereon a switch 15, chip capacitors 16, trimmer capacitors 17, etc. The base 7 is mounted on the inner barrel 2 in such a manner that a front raised portion 2c of the inner barrel 2 is fitted in a front notch 7A of the base 7, with a protrusion 2D of the inner barrel 2 being fitted in a circular hole 7B formed in the base 7 at its intermediate portion. Such fitting of the protrusion 2D in the hole 7B will ensure that the base 7 is mounted correctly on the inner barrel 2 at a predetermined position. A clearance is provided between the front notch 7A of the base 7 and the front raised portion 2C of the inner barrel 2 so as to enable a slight adjustment to be made in the longitudinal direction. This will make it possible to mount the base 7 irrespective of a slight variation in the positions of the protrusion 2D and the front raised portion 2C.

Referring back to FIG. 2, the protrusion 2D of the inner barrel 2 is positioned immediately beneath a window 3B formed in the outer barrel 3. The window 3B receives a side button 18 having a fixing recess 18A in which is press fitted an upper protrusion 2E of the inner barrel 2. The fixing recess 18A and the upper protrusion 2E are circular in cross section with their diametrically opposite sides being flat cut to prevent mutual rotation. As shown in FIG. 1 the side button 18 has on its front end a radially inwardly projecting press portion 18B. The press portion 18B presses against the switch 15 disposed on the base 7 to perform switching operation.

By virtue of the provision of the side button 18 on the inner barrel 2 having the base 7 mounted thereon, correct or exact relative positioning can be achieved of the press portion 18B of the side button 18 and the switch 15. On the contrary, in the case of the side button 18 being anchored to the outer barrel 3 instead of the inner barrel 2, it would be difficult to perform reliable switching operation because the side button 18 and the switch 15 may offset from each other due to errors in relative mounting positions between the side button 18 and the outer barrel 3 and between the outer barrel 3 and the inner barrel 2. The side button 18 has on its rear inside a stopper 18C which is positioned relative to the base 7 so as to provide a reduced gap therebetween, thereby restricting any possible swinging action of the side button 18.

Figure 3:
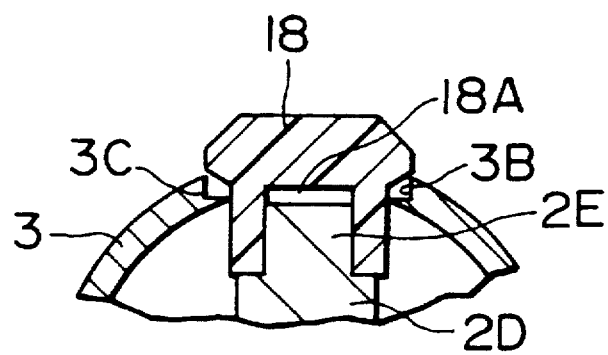
FIG. 3 is an enlarged fragmentary sectional view showing an outer barrel and a side button of the input pen in accordance with the present invention.

As best seen in FIG. 3, the window 3B of the outer barrel 3 is so configured as to have a small area enough to prevent the base 7 from being exposed to the outside through a gap which would otherwise be formed between the side button 19 and the window 3B. Additionally, the rear cap 4 has in the vicinity of its rear end a transverse through-hole 4A through which if required a string can be passed.

Figure 9:
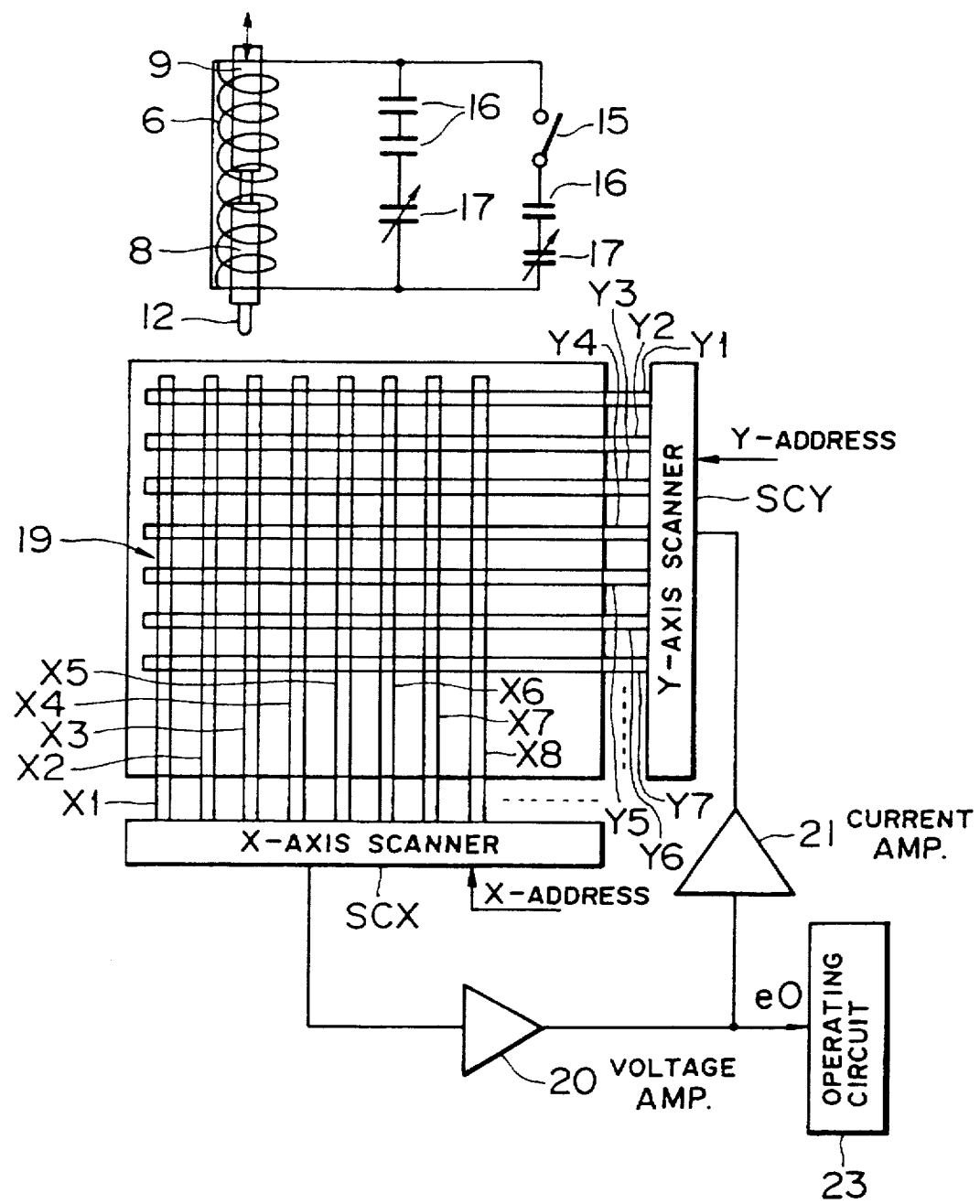
FIG. 9 is a combined schematic diagram for explaining the operation of the input pen in accordance with the present invention.

The switch 15, chip capacitors 16, trimmer capacitors 17, etc. are mounted on the base 7 and connected with the wires 6 and electric lines to constitute a LC circuit as shown in the upper part of FIG. 9. The LC circuit is used in combination with a tablet 19 shown in the lower part of FIG. 9. The tablet 19, which is a positional information input device, may be of another type than that shown in FIG. 9. If another type of tablet is used, the LC circuit shown in FIG. 9 must be replaced by another circuit.

FIG. 9 schematically shows the coiled wire 6, fixed core 8 and movable core 9 of the input pen. The writing tip 12 of the input pen is contacted with the surface of the tablet 19 to draw lines. The tablet 19 has parallel X-conductors $X_1$, $X_2$, $X_3$, . . . extending along an X-axis and parallel Y-conductors $Y_1$, $Y_2$, $Y_3$, . . . extending along a Y-axis, the X-conductors and Y-conductors intersecting with each other at right angles. The X-conductors $X_1$, $X_2$, $X_3$, . . . are associated with an X-scanner SCX, and the Y-conductors $Y_1$, $Y_2$, $Y_3$, . . . are associated with a Y-scanner SCY. One of the X-conductors is selected in turn by the X-scanner SCX, and one of the Y-conductors is selected in turn by the Y-scanner SCY. These X- and Y-scanners SCX and SCY are connected to a voltage amplifier 20 and a current amplifier 21, respectively, and outputs of these amplifiers 20 and 21 are supplied to an operating circuit 23.

When the coil 5 of the wire 6 is caused to approach the surface of the tablet 19, selected ones of the X-conductors and Y-conductors (X- and Y-conductors nearest to the coil 5), the two amplifiers 20 and 21 and the coil 5 form a closed loop and constitute a self-oscillation circuit. This self-oscillation circuit starts oscillation responsive to noise radio waves in the surrounding and produces a signal eO of a magnitude corresponding to the distances between the input pen and the X- and Y-conductors that are selected. This signal eO is supplied to the operating circuit 23.

The number of the X-conductors are selected in turn by means of the X-scanner SCX. Likewise, the number of the Y-conductors are selected in turn by means of the Y-scanner SCY. As a result, a number of self-oscillation circuits incorporating different conductors in the tablet 19 are formed. Different signals eO are thus obtained from the number of self-oscillation circuits. The magnitudes of these signals eO are functions of the distances between the input pen and the conductors, respectively. These different signals eO are supplied to the operating circuit 23, and a calculation is executed in the circuit 23 to identify a specific position of the input pen in the X-Y coordinate system.

When writing pressure is applied to the writing tip 12 of the input pen, the writing tip 12 is retracted together with the movable core 9, compressing the resilient member 11 (FIG. 1). More specifically, the movable and fixed cores 9 and 8 within the coil 5 are moved apart so that increased magnetic fluxes leak through the enlarged gap between the two cores. The increased leak of the magnetic fluxes function to continuously change the inductance of the coil 5. The change of the inductance produces a change in the frequency of the signal eO in the self-oscillation circuit. Therefore, writing pressure information of the input pen can be detected by measuring the frequency of the signal eO by means of the operating circuit 23.

As described above, the input pen according to the present invention utilizes an electromagnetic (or electrostatic) association between a number of conductors of a tablet 19 and an electric coil 5 of the pen. In the case of deriving writing pressure information (including information of other conditions) of the pen by utilizing changes in inductance of a coil, as in the device shown in FIG. 9, the provision of a stationary coil 8 as well as a movable coil 9 that moves relative to the stationary core 8 responsive to conditions (including writing pressure) of the pen, is effective.

As described above, the input pen of the present invention makes it possible for various kinds of data to be inputted with a sense similar to the sense of the writing. In normal writing on a sheet of paper, when writing is made with a strong force, a thick line is produced, and when writing is made with a weak force, a thin line is produced. According to the present invention, writing pressure or force information can be inputted in exactly the same manner as in the case of normal writing.

When the side button 18 of the input pen is depressed, the switch 15 on the base 7 (FIG. 8) is closed and other capacitors 16 and 17 are included in the circuit of the switch 15 as indicated in the schematic diagram of FIG. 9. Therefore, the frequency of the signal eO is changed whereby on-off information of the switch 15 is transmitted to the side of the tablet 19.

Figure 10:
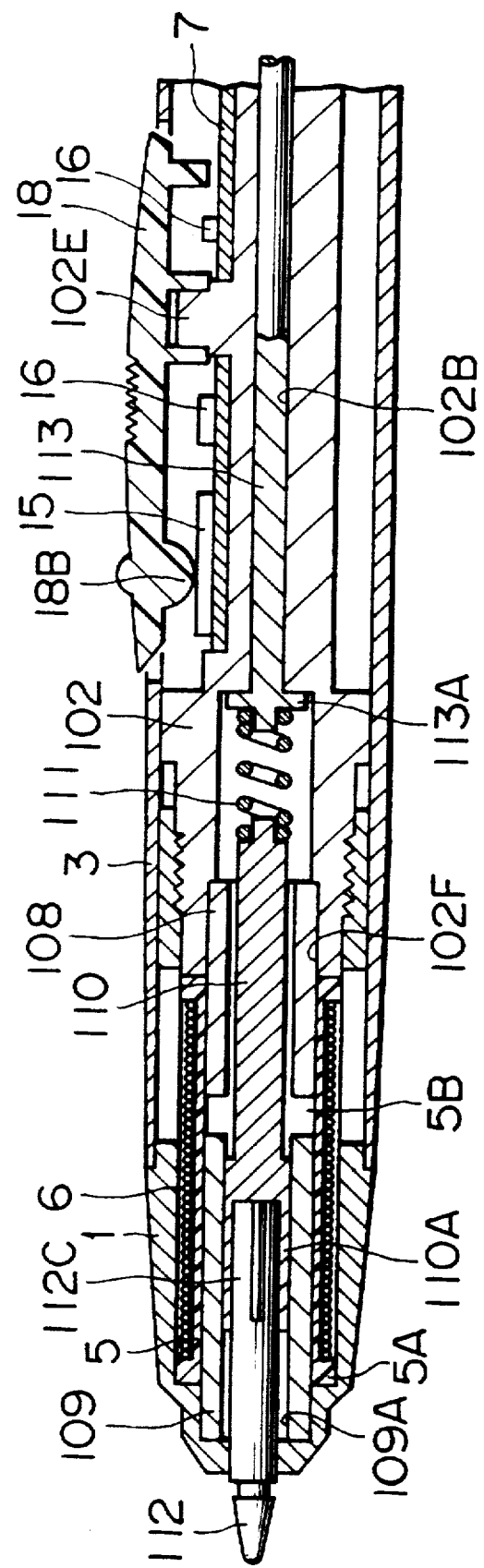
FIG. 10 is a longitudinal sectional view showing the main portion of another embodiment of the input pen in accordance with the present invention.

Referring to FIG. 10 which illustrates another embodiment of the input pen constructed in accordance with the present invention, a movable magnetic core 109 is slidably inserted into the front part of a through-hole 5B in a bobbin 5 having a wire 6 wound therearound. A joint 110 is press fitted into a through-hole 109A in the movable core 109. A writing tip member 112 has a shaft 112C fitted removably in a tubular front part 110A of the joint 110. The writing tip member 112 is so positioned as to project beyond the foremost cylinder extremity by a predetermined length. A fixed magnetic core 108 is partly received in the rear part of the through-hole 5B in the bobbin 5, the remaining part of the fixed core 108 being anchored into a front hole 102F formed in an inner barrel 102. The fixed core 108 may be anchored to the bobbin 5. The inner barrel 102 includes a bore 102B which receives the rear part of a push rod 113 from forward. A resilient member 111 in the form of a coil spring is interposed between a collar 113A located at the front end of the push rod 113 and a shoulder formed in the rear end of the joint 110. The inner barrel 102 receives in the vicinity of its rear end a screw not shown but similar to the one used in the FIG. 1 embodiment. The screw is adjusted to control the longitudinal position of the push rod 113, to thereby set the load upon mounting of the resilient member 111 to a predetermined design load.

In this embodiment, when the operator applies a pressure on the writing tip member 112 by hand to press it against the tablet, the movable core 109 together with the writing tip member 112 will retreat while compressing the resilient member 111 and come closer to the fixed core 108. This will result in a reduction in the amount of leakage of the magnetic flux which will occur through a gap between the movable core 109 and the fixed core 108, thus causing the coil inductance to vary in a continuous manner.

Although the resilient member has been comprised of a coil spring in the above embodiments, the resilient member is not intended to be limited to the coil spring, but instead a rubber such as a silicon ball is also available. It would also be possible in the case of employing the rubber as the resilient member to control the load upon mounting of the resilient member by adjusting the longitudinal position of the push rod in the same manner as the case of the coil spring.

Two or more elements of the foremost cylinder, outer barrel, inner barrel, rear cap, etc., may be integrated by screwing or anchoring.

According to the above embodiments, information of variation in the writing pressure applied on the writing tip member can be transmitted to the tablet side by use of simple means, and improved maneuverability upon the input operation can be attained due to the absence of a cable, etc., in the input pen.

Moreover, by adjusting the push rod, control can be made of the load upon mounting of the resilient member biasing the writing tip member forward, whereby the resilient member can be mounted constantly under a predetermined load independently from variations in dimensions of the components. A reliable detection is thus achieved of the pressure applied to the writing tip by operator's hand.

A further embodiment of the present invention will be described with reference to FIGS. 11 to 16. As can be seen from FIG. 11, a wire 6 is wound a predetermined number of turns around the peripheral surface of a bobbin 5 to provide a coil. The bobbin 5 has collars 5A at its opposite ends. Referring in particular to FIGS. 14 and 15, a foremost cylinder 301 comprises a tubular rear part 301E including a side aperture 301F having a rear edge 301G. A slit 301H extends from the rear edge 301G to the rear end of the foremost cylinder 301. The foremost cylinder 301 is formed with a bore 301J which receives the above-described coil in such a manner that the collars 5A of the bobbin 5 are press-fit anchored into the bore 301J of the foremost cylinder 301. The anchoring of the collars 5A of the bobbin 5 into the bore 301J is not limited to the press-fit anchoring, and adhesion or a combination of the press-fit anchoring and the adhesion is also available.

Figure 13:
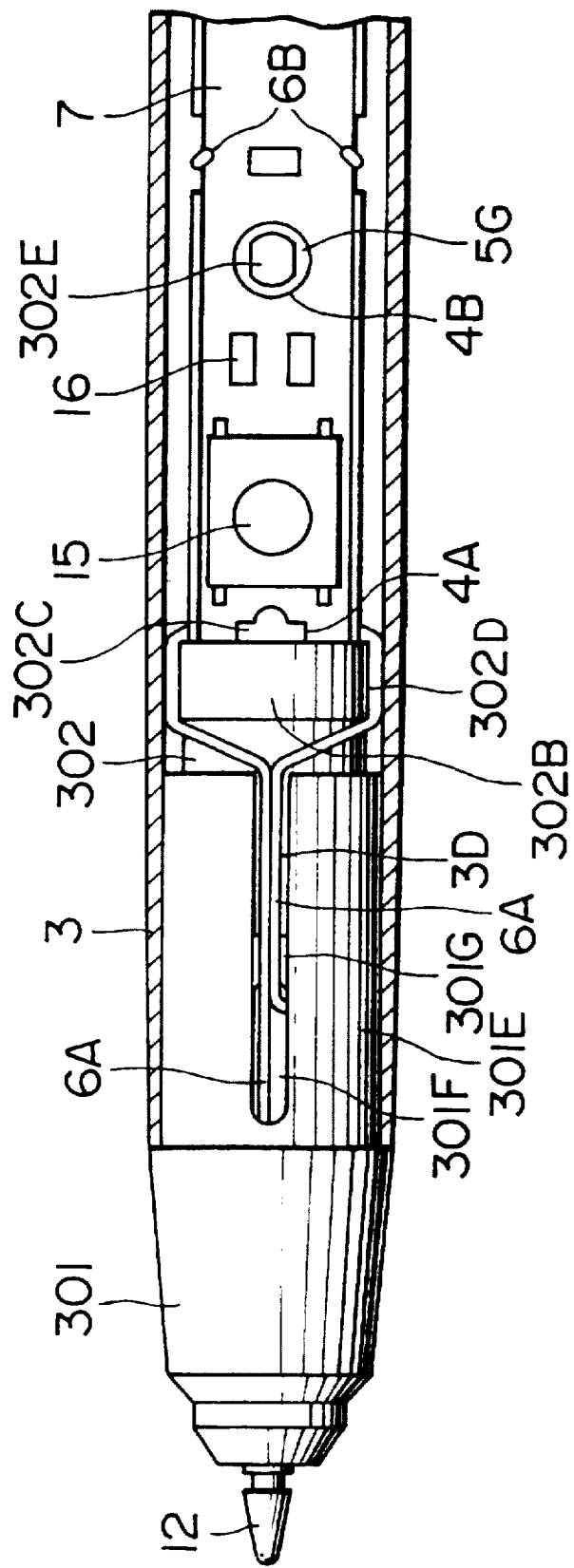
FIG. 13 is a sectional view of the FIG. 11 embodiment as viewed from above in FIG. 11.

As seen in FIGS. 11 and 13, a couple of leads 6A of the wire on the coil extend through the side aperture 301F of the foremost cylinder 301 to the exterior and are passed in the slit 301H of the foremost cylinder 301 to extend rearward. A base 7 is secured to an inner barrel 302 having a front part 302A which is screwed into a rear part 301E of the foremost cylinder 301. An appropriate spacing is provided between the rear end of the foremost cylinder 301 and a collar 302B of the inner barrel 302. A side cutout 302D is formed in each of the two sides of the collar 302B. The couple of leads 6A lying in the slit 301H of the foremost cylinder 301 diverge to pass through a pair of spaces each defined between the rear end of the foremost cylinder 301 and the collar 302B, and are passed along the cutouts 302D of the collar 302B, respectively. The leads 6A further extend rearward and are soldered to the base 7 at 6B. The base 7 has mounted thereon a switch 15, a chip capacitor 16, etc.

The thus constructed members such as the foremost cylinder 301 and the inner barrel 302 are inserted into the bore 3A of an outer barrel 3 from the front thereof in such a manner that the outer diameter of the collar 302B fits the inner diameter of the bore 3A of the outer barrel 3, to thereby prevent the inner barrel 302 from rocking. At the time of insertion of the foremost cylinder 301 and the inner barrel 302 into the outer barrel 3, the leads 6A are positioned in the slit 301H of the foremost cylinder 301, in the space between the rear end of the foremost cylinder 301 and the collar 302B, and along the cutouts 302D of the collar 302B, so that there is no fear that the leads 6A will be brought into press contact with the inner wall confining the bore 3A of the outer barrel 3. This means that there is no risk of breaking or severing of the leads 6A. Other features than the above are substantially the same as those illustrated in FIG. 1 and hence will not be further described.

Figure 16:
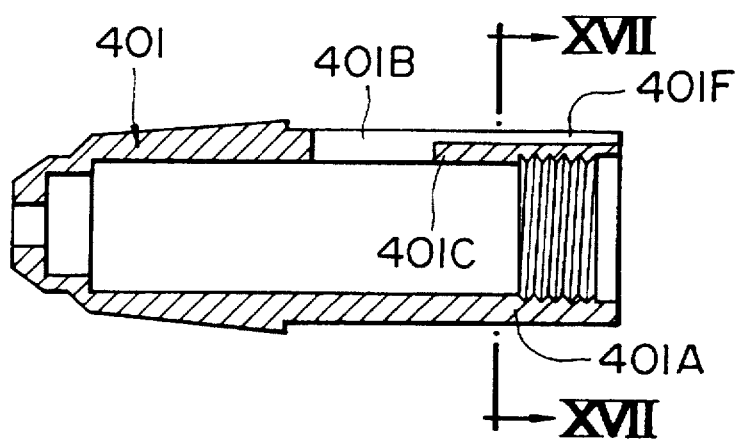
FIG. 16 is a sectional view showing a variant of the foremost cylinder of FIG. 14.
Figure 17:
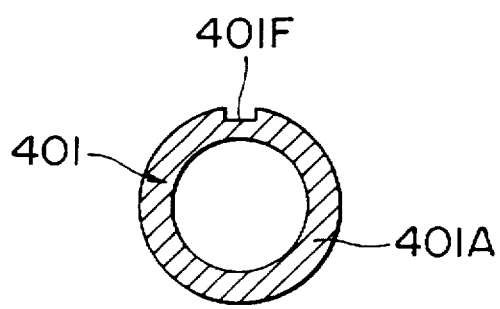
FIG. 17 is a sectional view taken along a line XVII—XVII of FIG. 16.

Referring to FIGS. 16 and 17 which illustrate another embodiment of the foremost cylinder for use in the present invention, a foremost cylinder 401 has in its rear part 401A a side aperture 401B and a recess 401F extending rearward from the rear edge 401C of the side aperture 401B. In this instance, the leads 6A pass through the side aperture 401B to the exterior and then are passed through the recess 401F.

Figure 18:
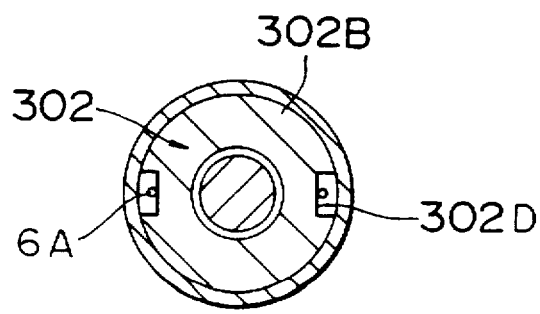
FIG. 18 illustrates a variant of an inner barrel shown in FIG. 12.

Reference is then made to FIG. 18 which illustrates another embodiment of the inner barrel 302 for use in the present invention. As shown, the inner barrel 302 includes longitudinally extending recesses 302D each in the shape of a recessed groove formed externally of the collar 302B of the inner barrel 302.

Figure 19:
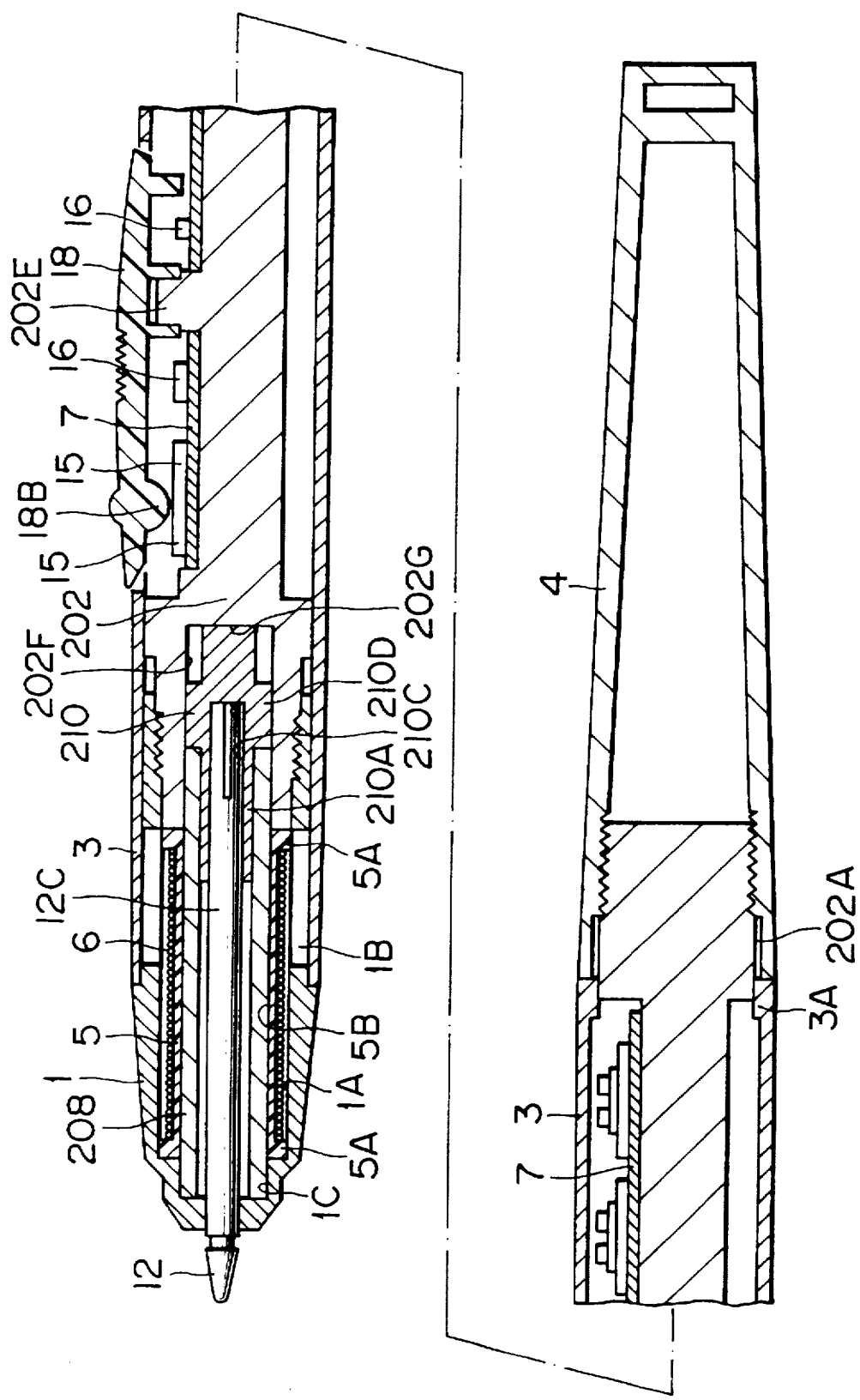
FIG. 19 is a longitudinal sectional view showing a still further embodiment of the input pen in accordance with the present invention.

FIG. 19 shows a still further embodiment of the input pen constructed in accordance with the present invention. The front part of an inner barrel 202 is shown received in the rear part of the foremost cylinder 1, with the inner barrel 202 being introduced into an outer barrel 3 from the front. The inner barrel 202 has a rear part which protrudes beyond the rear end of the outer barrel 3 and which includes a key groove 202A adapted to be engaged with a key 3A formed on the rear end of the outer barrel 3. A rear cap 4 is screwed onto the rear part of the inner barrel 202 so that the outer barrel 3 is clamped between the foremost cylinder 1 and the rear cap 4. A wire 6 is wound a predetermined number of turns around a bobbin 5 made of a synthetic resin to provide a coil. The bobbin 5 has at its opposite ends collars 5A with a height larger than the diameter of the wire 6 wound therearound. The collars 5A are press-fit anchored into the bore 1A of the foremost cylinder 1. The anchoring of the collars 5A of the bobbin 5 into the bore 1A is not limited to the press-fit anchoring. Adhesion or a combination of the press-fit anchoring and adhesion may be employed. The leads of the coil wire 6 pass through the transverse aperture 1B of the foremost cylinder 1 and through a groove formed in the peripheral surface of the foremost cylinder 1 and are led to the base 7 which will be described later. The bobbin 5 includes a through-hole 5B which receives a fixed magnetic core 208 made of ferrite, the fixed magnetic core 208 being anchored into the front bore 1C of the foremost cylinder 1 and into the through-hole 5B of the bobbin 5. The fixed magnetic core 208 includes a through-hole 208A which receives a reduced-diameter tubular front part 210A of a joint 210. The joint 210 includes a bore 210C which removably receives a shaft 12C of a writing tip 12, with the extremity of the tip 12 projecting from the front end of the foremost cylinder 1 by a desired length. The joint 210 is provided with an enlarged-diameter portion 210D which is introduced into a front hole 202F of the inner barrel 202, and is clamped between the rear end of the fixed magnetic core 208 and a front hole bottom 202G of the inner barrel 202. The inner barrel 202 has mounted thereon a base 7 carrying thereon a switch 15, capacitors 16, a side button 18, etc.

Although it is not possible in this embodiment, unlike the above embodiments, to input information of variation in writing pressure applied by the operator's hand, positional information can be provided as input to the tablet by causing the coil arranged in the input pen to approach the tablet.

Although a variety of types of means are conceivable for inputting positional information to the tablet, any type of input pen as long as it includes a coil can be used available as the input means of the present invention.

What is claimed is:

1. An input pen comprising:

a pen body;

an electric coil including a bobbin and an electric wire wound therearound, said bobbin being secured within said pen body and having a longitudinal through-hole extending therein;

a writing tip member having a shaft extending rearward and fitted slidably within said pen body, said writing tip member having a writing tip projecting beyond a forward end of said pen body;

a movable magnetic core fitted in said through-hole of the coil and connected with said writing tip member with respect to a longitudinal direction of the pen body;

a fixed magnetic core provided within said through-hole;

said writing tip upon writing being pressed into said pen body to displace said movable magnetic core relative to said fixed magnetic core, thereby producing a variation in inductance of said coil, said variation providing information of a variation in writing pressure;

a joint secured both to said shaft of said writing tip and to said movable magnetic core;

a push rod received within said pen body at a rear of said joint for longitudinal displacement;

resilient means interposed between said push rod and said joint; and means for adjusting and fixing a longitudinal position of said joint to control a resilient force of said resilient means.

2. An input pen according to claim 1, wherein:

said movable magnetic core includes a longitudinal through-hole formed therein, said joint having at a front part thereof a reduced-diameter portion which is fixedly fitted in said through-hole of the movable magnetic core.

3. An input pen according to claim 1, wherein:

said shaft of said writing tip member has a rear end securely fitted in a front part of said joint.

4. An input pen according to claim 1, wherein:

said pen body includes an inner barrel secured within said pen body and including a longitudinal bore, said push rod being slidably received in said bore of said inner barrel.

5. An input pen according to claim 4, wherein:

said means for controlling a resilient force of said resilient means is composed of a screw which is screwed into the rear end portion of said longitudinal bore of said inner barrel so as to abut against the rear end of said push rod.

6. An input pen according to claim 4, wherein:

said movable magnetic core is positioned rearward of said fixed magnetic core.

7. An input pen according to claim 4, wherein:

said movable magnetic core is positioned foreward of said fixed magnetic core.

8. An input pen according to claim 1, wherein:

said resilient means comprises a coil spring.

9. An input pen according to claim 1, wherein:

said bobbin has collars at opposite ends thereof, said collars having a height greater than a winding diameter of said wire wound around said bobbin.

10. An input pen according to claim 1, wherein:

said pen body includes a foremost cylinder having a longitudinal bore formed therein and constituting a front end portion of said pen body, said collars of the bobbin being fitted in said bore of said foremost cylinder.

11. An input pen according to claim 1, wherein:

said pen body includes an inner barrel secured within said pen body, and a foremost cylinder constituting a front end portion of said pen body;

said foremost cylinder has a rear part secured to a front part of said inner barrel and has said bobbin fixed therein; and said foremost cylinder includes side aperture formed to coincide with a region where said bobbin is located, said wire wound around said bobbin extending through said side aperture of the foremost cylinder to an outer region of said inner barrel.

12. An input pen according to claim 11, wherein:

said foremost cylinder includes a longitudinal slit through which said wire extends and which is positioned rearward of said side aperture of said foremost cylinder.

13. An input pen according to claim 11, wherein:

said inner barrel has a front part screwed into said rear part of said foremost cylinder.

14. An input pen according to claim 11, wherein:

said inner barrel is provided with a collar press-fitted in said pen body, said wire extending rearward through said side aperture of the foremost cylinder and through a cutout formed in said collar.

15. An input pen according to claim 14, wherein:

said pen body includes a base secured to said inner barrel and carrying thereon electric elements; and said wire extends rearward through said cutout formed in said collar and is connected to said electric elements on said base.

16. An input pen according to claim 1, wherein:

said pen body includes an inner barrel secured therein, and a base secured on said inner barrel and carrying thereon electric elements.

17. An input pen according to claim 16, wherein:

said inner barrel has on an external surface thereof a raised portion and a protrusion, said base being provided with a notch and a hole, said base being positioned relative to said inner barrel such that said raised portion and said protrusion are fitted respectively in said notch and said hole.

18. An input pen according to claim 1, wherein:

said pen body includes:

an outer barrel having a window;

an inner barrel secured within said outer barrel and having a protrusion formed on an external surface thereof;

a base secured to an external surface of said inner barrel and having an operation switch thereon;

a side button disposed in said window and having at one end thereof a press section for operating said switch, said side button having a mounting shank formed at an intermediate portion thereof; and said press section confronting said switch with said shank of the side button attached to said protrusion on said inner barrel.

19. An input pen according to claim 18, wherein:

said side button is provided on an opposite side to said press section with a stopper extending toward said base for operating said switch, said stopper preventing said side button from rocking.

20. An input pen according to claim 18, wherein:

said shank of said side button has a smaller width than that of said side button, said window of said outer barrel having a width smaller than that of said side button, said shank of the side button extending into said pen body through said window so as to prevent the interior of said pen body from being viewed.

21. An input pen comprising:

a pen body;

an electric coil secured within said pen body and including a bobbin having a longitudinal through-hole therein, and an electric wire wound therearound;

a writing tip member having a shaft extending rearward and fitted in said pen body, said writing tip member having a writing tip projecting forward from said pen body;

a fixed magnetic core secured in said through-hole; and said bobbin having collars at opposite ends thereof, said collars having a height greater than a winding diameter of said wire wound around said bobbin.

* * * * *

UNITED STATES PATENT AND TRADEMARK OFFICE
CERTIFICATE OF CORRECTION

PATENT NO. : 5,895,895

DATED : April 20, 1999

INVENTOR(S) : Kazuhiko Ono, et al.

It is certified that error appears in the above-identified patent and that said Letters Patent is hereby corrected as shown below:

On the title page, Item [54], change title to read --INPUT PEN FOR COMPUTER GRAPHICS AND THE LIKE--.

Signed and Sealed this

Fifth Day of October, 1999

*Attest:*

Q. TODD DICKINSON

*Attesting Officer*    Acting Commissioner of Patents and Trademarks